United States Patent
Zhang et al.

(10) Patent No.: US 12,340,474 B2
(45) Date of Patent: Jun. 24, 2025

(54) IMAGE EFFECT IMPLEMENTING METHOD AND APPARATUS, ELECTRONIC DEVICE AND STORAGE MEDIUM

(71) Applicants: Beijing Bytedance Network Technology Co., Ltd., Beijing (CN); BYTEDANCE INC., Los Angeles, CA (US)

(72) Inventors: Jingcong Zhang, Los Angeles, CA (US); Yunzhu Li, Los Angeles, CA (US); Haoze Li, Los Angeles, CA (US); Zhili Chen, Los Angeles, CA (US); Linjie Luo, Los Angeles, CA (US); Jing Liu, Los Angeles, CA (US); Xiao Yang, Los Angeles, CA (US); Guohui Wang, Los Angeles, CA (US); Jianchao Yang, Los Angeles, CA (US); Xuchen Song, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 142 days.

(21) Appl. No.: 18/004,810

(22) PCT Filed: Jun. 22, 2021

(86) PCT No.: PCT/CN2021/101653
§ 371 (c)(1),
(2) Date: Jan. 9, 2023

(87) PCT Pub. No.: WO2022/007627
PCT Pub. Date: Jan. 13, 2022

(65) Prior Publication Data
US 2023/0245398 A1    Aug. 3, 2023

(30) Foreign Application Priority Data

Jul. 10, 2020    (CN) .......................... 202010663931.5

(51) Int. Cl.
*G06T 19/00*    (2011.01)
*G06F 3/04815*    (2022.01)
(Continued)

(52) U.S. Cl.
CPC ........ *G06T 19/006* (2013.01); *G06F 3/04815* (2013.01); *G06T 7/251* (2017.01);
(Continued)

(58) Field of Classification Search
None
See application file for complete search history.

(56) References Cited

U.S. PATENT DOCUMENTS

2011/0285636 A1* 11/2011 Howard ............... G06F 3/04883
345/173
2012/0249741 A1* 10/2012 Maciocci ............... G06T 19/006
348/51

(Continued)

FOREIGN PATENT DOCUMENTS

CN    106772996 A    5/2017
CN    106792078 A    5/2017
(Continued)

OTHER PUBLICATIONS

China National Intellectual Property Administration, Notice of Allowance Issued in Application No. 202010663931.5, May 31, 2022, 6 pages.
(Continued)

*Primary Examiner* — Kent W Chang
*Assistant Examiner* — Jonathan M Cofino
(74) *Attorney, Agent, or Firm* — Alleman Hall & Tuttle LLP

(57) ABSTRACT

An image effect implementing method is described herein that includes: acquiring a first image, recognizing a set object in the first image, and acquiring an augmented reality model corresponding to the set object; superimposing, according to coordinate information of pixels of the set object, the augmented reality model onto the first image to obtain a second image; and upon detection of a preset deformation event, controlling, according to a set deformation policy, at least one sub-model of the augmented reality model in the second image to deform, and displaying the deformed second image.

16 Claims, 3 Drawing Sheets

(51) Int. Cl.
    *G06T 7/246*     (2017.01)
    *G06T 19/20*     (2011.01)

(52) U.S. Cl.
    CPC .......... *G06T 19/20* (2013.01); *G06T 2200/24* (2013.01); *G06T 2219/2016* (2013.01); *G06T 2219/2021* (2013.01)

(56) References Cited

U.S. PATENT DOCUMENTS

| | | | |
|---|---|---|---|
| 2013/0281206 A1 | 10/2013 | Lyons et al. | |
| 2014/0267404 A1* | 9/2014 | Mitchell | G06T 19/006 345/633 |
| 2017/0083115 A1* | 3/2017 | Speck | G06F 3/0383 |
| 2019/0287305 A1* | 9/2019 | Guay | G06T 19/006 |
| 2019/0371071 A1* | 12/2019 | Lyons | G06T 7/246 |
| 2020/0139240 A1* | 5/2020 | Hrincár | G06T 13/40 |
| 2021/0390785 A1* | 12/2021 | Driancourt | G06V 10/40 |
| 2022/0277552 A1* | 9/2022 | Takahashi | G06V 10/778 |

FOREIGN PATENT DOCUMENTS

| | | |
|---|---|---|
| CN | 107633479 A | 1/2018 |
| CN | 107635104 A | 1/2018 |
| CN | 108245891 A | 7/2018 |
| CN | 108399653 A | 8/2018 |
| CN | 108696699 A | 10/2018 |
| CN | 109064387 A | 12/2018 |
| CN | 109147023 A | 1/2019 |
| CN | 109242982 A | 1/2019 |
| CN | 109427096 A | 3/2019 |
| CN | 109656363 A | 4/2019 |
| CN | 110716645 A | 1/2020 |
| CN | 111833461 A | 10/2020 |
| WO | 2018121684 A1 | 7/2018 |
| WO | 2018124736 A1 | 7/2018 |

OTHER PUBLICATIONS

China National Intellectual Property Administration, Office Action Issued in Application No. 202010663931.5, Oct. 20, 2021, 16 pages.
China National Intellectual Property Administration, Office Action Issued in Application No. 202010663931.5, Mar. 1, 2022, 16 pages.
Xu, M. et al., "Development of an Augmented Reality Interactive App Based on Unity3D+Vuforia," Hubei Normal University, 2016, 5 pages. (See abstract on p. 5 for explanation of relevance.).
ISA China National Intellectual Property Administration, International Search Report Issued in Application No. PCT/CN2021/101653, Sep. 13, 2021, WIPO, 15 pages.
Zhou, J. et al., "On User-Defined Region Matching for Augmented Reality," Proceedings of the IEEE 28th Canadian Conference on Electrical and Computer Engineering, May 3, 2015, Halifax, Canada, 6 pages.

* cited by examiner

IMAGE EFFECT IMPLEMENTING METHOD AND APPARATUS, ELECTRONIC DEVICE AND STORAGE MEDIUM

CROSS REFERENCE TO RELATED APPLICATIONS

This application is a National Stage of International Application No. PCT/CN2021/101653, filed on Jun. 22, 2021, which claims priority to Chinese Patent Application No. 202010663931.5, filed on Jul. 10, 2020, both of which are hereby incorporated by reference in their entireties.

TECHNICAL FIELD

Embodiments of the present application relate to the field of computer technologies, and particularly to an image effect implementing method and apparatus an electronic device, a storage medium, a computer program product and a computer program.

BACKGROUND

AR (Augmented Reality) technology is a technology according to which an actual environment can be combined with virtual information to realize displaying, on a screen of an intelligent terminal, an image obtained by superimposing an AR model onto an image about the real world.

Currently, shooting a video with an intelligent terminal is merely to visually record an object being shot, and an intelligent terminal with an augmented reality function can only provide some simple application scenarios, such as background replacement, sticker adding or the like. The display effect is relatively simple, which cannot meet a requirement of a user for pursuing new ways of playing.

SUMMARY

The embodiments of the present disclosure provide an image effect implementing method and apparatus, an electronic device, a storage medium, a computer program product and a computer program, which can enrich a display effect of a captured image.

In a first aspect, an embodiment of the present disclosure provides an image effect implementing method, including:
acquiring a first image, recognizing a set object in the first image, and acquiring an augmented reality model corresponding to the set object;
superimposing, according to coordinate information of pixels of the set object, the augmented reality model onto the first image to obtain a second image; and
upon detection of a preset deformation event, controlling, according to a set deformation policy, at least one sub-model of the augmented reality model in the second image to deform, and displaying the deformed second image.

In a second aspect, an embodiment of the present disclosure further provides an image effect implementing apparatus, including:
a model acquiring module, configured to acquire a first image, recognize a set object in the first image, and acquire an augmented reality model corresponding to the set object;
a model superimposing module, configured to superimpose, according to coordinate information of pixels of the set object, the augmented reality model onto the first image to obtain a second image; and
a deformation controlling module, configured to control, upon detection of a preset deformation event, at least one sub-model of the augmented reality model in the second image to deform, according to a set deformation policy, and display the deformed second image.

In a third aspect, an embodiment of the present disclosure further provides an electronic device. The electronic device includes:
one or more processors, and
a memory for storing one or more programs;
where the one or more programs, when being executed by the one or more processors, enable the one or more processors to implement the image effect implementing method according to the first aspect.

In a fourth aspect, an embodiment of the present disclosure further provides a computer-readable storage medium having a computer program stored thereon, where the image effect implementing method according to the first aspect is implemented when the program is executed by a processor.

In a fifth aspect, an embodiment of the present disclosure further provides a computer program product having a computer program stored thereon, where the image effect implementing method according to the first aspect is implemented when the program is executed by a processor.

In a sixth aspect, an embodiment of the present disclosure further provides a computer program. The computer program, when running on a computer, enables the computer to implement the image effect implementing method according to the first aspect.

According to the image effect implementing method and apparatus, the electronic device, the storage medium, the computer program product and the computer program provided in the embodiments of the present disclosure provide, a second image is obtained by means of acquiring an augmented reality model corresponding to a set object in a first image, and superimposing, according to coordinate information of pixels of the set object, the augmented reality model onto the first image; and upon detection of a preset deformation event, at least one sub-model of the augmented reality model in the second image is controlled to deform, and the deformed second image is displayed. After the augmented reality model is added to the first image, pixels of the augmented reality model in each frame of image can be adjusted to deform the augmented reality model, thereby the effect of displaying a deformation process of the augmented reality model is realized, an image display effect is enriched, a problem that the display effect is relatively simple in a current shooting scenario is solved, and a new way of playing is provided to improve user experience.

BRIEF DESCRIPTION OF DRAWINGS

In conjunction with the accompanying figures and with reference to the following specific implementations, the above and other features, advantages and aspects of various embodiments of the present disclosure will be more apparent. Throughout the figures, the same or similar reference numbers refer to the same or similar elements. It should be understood that the figures are schematic, where components and elements are not necessarily drawn to scale.

DESCRIPTION OF EMBODIMENTS

Embodiments of the present disclosure will be described in more detail hereunder with reference to the accompanying drawings. Although certain embodiments of the present disclosure are shown in the drawings, it should be understood that the present disclosure may be implemented in various forms and should not be construed as being limited to the embodiments set forth herein. Instead, these embodiments are provided for a more thorough and complete understanding of the present disclosure. It should be understood that the drawings and embodiments of the present disclosure are only used for illustrative purposes, rather than limiting the protection scope of the present disclosure.

It should be understood that various steps described in a method embodiment of the present disclosure may be performed in different orders and/or in parallel. Furthermore, the method embodiment may include additional steps and/or omit execution of an illustrated step. The scope of the present disclosure is not limited in this aspect.

The term "comprising" and variations thereof herein mean inclusively including, i.e., "including but not limited to". The term "based on" means "based at least in part on". The term "an embodiment" means "at least one embodiment"; the term "another embodiment" means "at least one additional embodiment"; the term "some embodiments" means "at least some embodiments". Relevant definitions of other terms will be given in the description below.

It should be noted that the concepts such as "first" and "second" mentioned in the present disclosure are merely used to distinguish different apparatus, modules or units, rather than limit an order or an interdependence of the functions performed by these apparatus, modules or units.

It should be noted that the singular or plural modification mentioned in the present disclosure is illustrative rather than restrictive. Persons skilled in the art should understand that, unless being clearly indicated otherwise in the context, it should be interpreted as "one or more".

Figure 1:
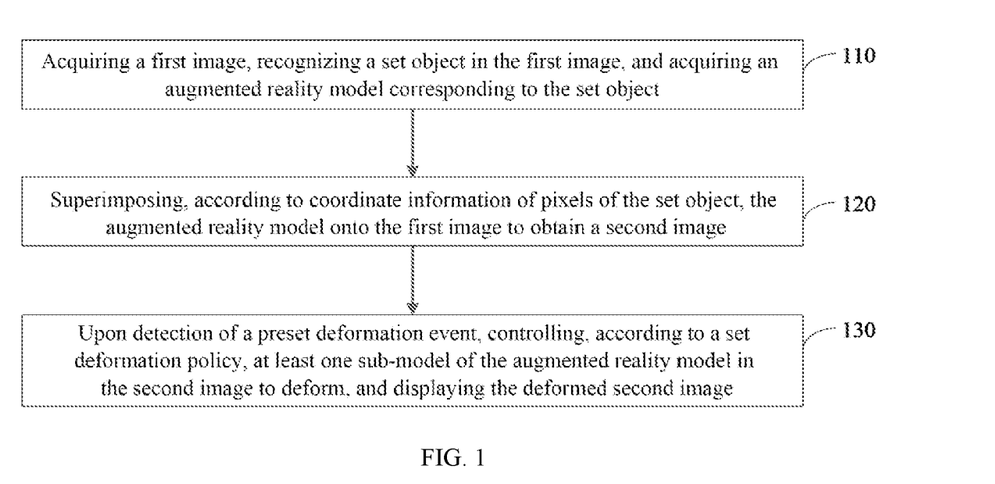
FIG. 1 is a flowchart of an image effect implementing method according to an embodiment of the present disclosure.

FIG. 1 is a flowchart of an image effect implementing method according to an embodiment of the present disclosure. The method can be performed by an image effect implementing apparatus. The apparatus may be implemented by software and/or hardware, and typically set in an electronic device. As shown in FIG. 1, the method includes:

Step 110, acquiring a first image, recognizing a set object in the first image, and acquiring an augmented reality model corresponding to the set object.

In the embodiment of the present disclosure, the first image may be an image about the real world captured by a camera of an electronic device, for example, multiple frames of raw images captured through a smartphone.

A 3D (Three Dimensional) model is established in advance for a certain object in the real world to be used as an augmented reality model. An object with an augmented reality model may be referred to as a set object. In the embodiment of the present disclosure, 3D models are built for landmark buildings in advance to be used as augmented reality models corresponding to the landmark buildings. Augmented reality models can be built for different objects according to actual needs, and a type of an object is not limited in the embodiments of the present disclosure.

For example, in duration of a shooting event, acquire the first image according to a set period; recognize the first image, and determine, according to a recognition result, whether the set object is contained in the first image; upon determining that the set object is contained in the first image, acquire the augmented reality model corresponding to the set object. In the embodiment of the present disclosure, the step of acquiring the augmented reality model corresponding to the set object includes but not limited to: acquiring the augmented reality model corresponding to the set object from a resource library of a client, or, requesting, by an intelligent terminal, the augmented reality model corresponding to the set object from a server. For example, the client downloaded by the intelligent terminal has a built-in resource library which includes some commonly used augmented reality models. Moreover, when the server has new resources, the server can issue an update notification to the client, to thereby remind the client that the built-in resource library can be updated. In an implementation, if a user needs to download the new resources, the server can sort the resources in the download list according to the user's use preference so as to prioritize display of a resource that meets the user's use preference. Or, after the set object in the first image is recognized, the augmented reality model corresponding to the set object is acquired from the server. In an implementation, the downloaded augmented reality model can be cached locally for future use.

The set period is a preset empirical value, and the same set period or different set periods can be used under different shooting scenarios. A shooting scenario may be a sunrise scenario, a cloudy scenario, a sunny scenario, a daytime scenario, a dark scenario or the like, which is not specifically limited in the embodiment of the present disclosure.

S120, superimposing, according to coordinate information of pixels of the set object, the augmented reality model onto the first image to obtain a second image.

For example, determine, according to the coordinate information of the pixels of the set object, contour coordinates of the set object; determine, according to the contour coordinates, contour information of the set object, and perform scaling adjustment on the augmented reality model according to the contour information; and cover the set object with the adjusted augmented reality model according to the contour coordinates to obtain the second image.

For example, contour pixels of the set object are determined according to the coordinate information of the pixels of the set object, where coordinates of the contour pixels are the contour coordinates; and the contour coordinates are connected successively to obtain the contour information of the set object. Pixels of the augmented reality model are adjusted according to the contour information of the set object, thereby a scaling effect of the augmented reality model is realized so that the size of the augmented reality model is the same as that of the set object. In an implementation, when the augmented reality model includes multiple sub-models, pixels of each of the sub-models are adjusted separately to realize a scaling effect of the augmented reality model. There are various implementations to obtain the second image by means of covering the set object with the adjusted augmented reality model according to the contour coordinates. An exemplary implementation is to render the scaled augmented reality model to a second image layer, where the transparency of an area in the second image layer other than the augmented reality model is zero, that is, the area in the second image layer other than the augmented reality model is a transparent area, and an image layer where the first image is located is a first image layer; combine the second image layer and the first image layer to realize an effect that the scaled augmented reality model covers the set object. It should be noted that the size of the scaled augmented reality model is not limited to a same size as the set object, but also a size larger than the set object. For example, the size of the scaled augmented reality model is a multiple of the size of the set object, or the like. Or, determine, according to the coordinate information of the pixels of the set object, contour coordinates of the set object; determine, according to the contour coordinates, contour information of the set object, and perform scaling adjustment on the augmented reality model according to the contour information; and replace the set object with the adjusted augmented reality model according to the contour coordinates to obtain the second image. In an implementation, a further implementation to obtain the second image by means of covering the set object with the adjusted augmented reality model according to the contour coordinates may be to remove pixels of the set object in the first image layer, filling a corresponding area in the first image layer with the augmented reality model according to the contour coordinates to obtain the second image.

S130, upon detection of a preset deformation event, controlling, according to a set deformation policy, at least one sub-model of the augmented reality model in the second image to deform, and displaying the deformed second image.

It should be noted that the preset deformation event is used as an indication that at least one sub-model of the augmented reality model is deformed according to the set deformation policy. Conditions for triggering the preset deformation event are various, and the preset deformation event triggered under a different condition has a different piece of identification information, which is not specifically limited in the embodiment of the present disclosure. For example, trigger the preset deformation event upon detection of at least one item of the following content:

a human posture change in the second image satisfying a first preset condition;
music beats;
a touch operation satisfying a second preset condition;
a posture change of an electronic device satisfying a third preset condition.

It should be noted that a human posture is action information of a person in a captured image. For example, the human posture may be waist twisting, arm lift-up and lift-down, bowing, head movement or the like. In order to avoid deformation of the augmented reality model triggered by a misrecognized human posture, the first preset condition is set in advance in order to detect whether to trigger the deformation of the augmented reality model based on a human posture change. The first preset condition may be a rule on an amplitude of a human posture change, a type of a human posture or other aspects.

The music beats include a strong beat and a weak beat, and a strong beat threshold and a weak beat threshold are set. The music beats are detected according to the strong beat threshold and the weak beat threshold to determine related information of the strong beat and the weak beat. A deformation mode and a deformation degree of a sub-model in the augmented reality model are specified in advance according to regularity information of the strong beat and the weak beat such as an occurrence order, an occurrence time, the number of times of occurrence or the like, so as to show an effect that the augmented reality model is deformed with music. It should be noted that the deformation mode includes twisting, extruding or stretching, and the deformation degree includes a depth for the sub-model extending from or retracting into the augmented reality model. The augmented reality model may be divided into multiple cylindrical sub-models according to texture information of the set object. The texture information includes appearance information of the set object, for example, the modeling information of a building surface of a certain landmark building, such as a concavity of some area, a protrusion of some area or the like. According to the music beats, it is possible to control, at least one sub-model to extend from the augmented reality model, or at least one sub-model to flip, or at least one sub-model to retract into the augmented reality model, etc.

The touch operation is action information of a capturer. For example, the touch operation may be a click on a touch screen, a long press on the touch screen or a drag operation on the touch screen. In order to avoid deformation of the augmented reality model triggered by a misrecognized touch operation, the second preset condition is set in advance in order to detect whether to trigger the deformation of the augmented reality model based on a touch operation. The second preset condition may be a rule on a touch position, a touch type, a touch time or other aspects.

The posture of the electronic device is posture information of a terminal configured to capture images. For example, the posture change of the electronic device may be an "S" track of the electronic device in the air, a circle track of the electronic device in the air, a shift between a landscape mode and a portrait mode, or the like. In order to avoid deformation of the augmented reality model triggered by a misrecognized posture of the electronic device, the third preset condition is set in advance in order to detect whether to trigger the deformation of the augmented reality model based on a posture change of an electronic device. The third preset condition may be a rule on an amplitude or a type of a posture change of the electronic device, or other aspects.

For example, determine condition type information that triggers the preset deformation event according to identification information of the preset deformation event, match a corresponding deformation policy according to the condition type information, and adjust a position and a depth of field of a pixel of the at least one sub-model of the augmented reality model with use of the deformation policy so as to deform the at least one sub-model.

The meaning of adjusting includes replacing or modifying.

For example, replace the augmented reality model in the second image with the deformed augmented reality model to obtain the deformed second image. Or, determine inspected pixels whose positions and/or depths of field have changed, compare the augmented reality model before the deformation with the augmented reality model after the deformation to determine pixels to be adjusted in the second image. According to the inspected pixels, modify the pixels to be adjusted to obtain the deformed second image.

Display the deformed second image in a set order. The set order may be an order in which the first image is obtained, or an order in which the second image is generated, or other customized orders, which is not specifically limited in the embodiment of the present disclosure.

In the embodiment of the present disclosure, a second image is obtained by means of acquiring an augmented reality model corresponding to a set object in a first image, and superimposing, according to coordinate information of pixels of the set object, the augmented reality model onto the first image; and upon detection of a preset deformation event, at least one sub-model of the augmented reality model in the second image is controlled to deform, and the deformed second image is displayed. After the augmented reality model is added to the first image, the pixels of the augmented reality model in each frame of image may be adjusted to deform the augmented reality model, thereby an effect of displaying a deformation process of the augmented reality model is realized, an image display effect is enriched, a problem that the display effect is relatively simple in a current shooting scenario is solved, and a new way of playing is provided to improve user experience In an exemplary implementation, upon detection of the preset deformation event, the controlling, according to the set deformation policy, the at least one sub-model of the augmented reality model in the second image to deform may further be: upon detection of the preset deformation event triggered based on the human posture change in the second image, adjusting, according to human posture information, a corresponding pixel of the at least one sub-model of the augmented reality model, to obtain the deformed second image. For example, when the human posture information is waist twisting, adjust the augmented reality model to display an effect that the augmented reality model presents a waist twisting action. If the augmented reality model is a model corresponding to the Canton Tower, and it is detected that a person is twisting the waist when the person is in a photo session with the Canton Tower, adjust the augmented reality model to, thereby realize that the Canton Tower presents the waist twisting action. It should be noted that the adjusting, according to the human posture information, the corresponding pixel of the at least one sub-model of the augmented reality model, means adjusting a coordinate and/or a depth of field of at least one pixel.

In another exemplary implementation, upon detection of the preset deformation event, the controlling, according to the set deformation policy, the at least one sub-model of the augmented reality model in the second image to deform may further be: upon detection of the preset deformation event triggered based on the music beats, adjusting, according to the music beats, a corresponding pixel of the at least one sub-model of the augmented reality model, to obtain the deformed second image. For example, acquire music being played currently (music played by the electronic device or music in an environment or the like), recognize beat information such as a strong beat or a weak beat in the music, and adjust, according to a preset corresponding relationship between beats and the model deformation mode, a position or a depth of field of the corresponding pixel of the at least one sub-model of the augmented reality model, so as to deform the augmented reality model. It should be noted that, a video consisting of second images is displayed by means of adjusting the position and depth of field of the corresponding pixel of the at least one sub-module of the augmented reality model in each frame of second image, to display an effect that a sub-model extends from a surface of the augmented reality model or retracts into the augmented reality model, such that the deformation of the set object is simulated. Or, the video consisting of second images is displayed to display an effect that a surface of the augmented reality model is flipped.

In yet another exemplary implementation, upon detection of the preset deformation event, the controlling, according to the set deformation policy, the at least one sub-model of the augmented reality model in the second image to deform may further be: upon detection of the preset deformation event triggered by the touch operation, adjusting, according to attribute information of the touch operation, a corresponding pixel of the at least one sub-model of the augmented reality model, to obtain the deformed second image. The attribute information of the touch operation includes a touch position, a touch time, a number of times of touch, a touch type or the like. The deformation mode corresponding to the touch operation having different pieces of attribute information can be preset. The deformation mode may include a deformation order, a deformation type or a deformation degree of a sub-model. For example, a single click triggers the at least one sub-model to extend from a surface of the augmented reality model. Or, a double click triggers the at least one sub-model to retract into the augmented reality model. Or, a drag operation on an area of the augmented reality model triggers the at least one sub-model to extend from or retract into the surface of the augmented reality model. Or, a slide gesture outside the augmented reality model triggers the at least one sub-model to flip, etc.

In yet another exemplary implementation, upon detection of the preset deformation event, the controlling, according to the set deformation policy, the at least one sub-model of the augmented reality model in the second image to deform may further be: upon detection of the preset deformation event triggered based on the posture change of the electronic device, adjusting, according to posture information of the electronic device, a corresponding pixel of the at least one sub-model of the augmented reality model, to obtain the deformed second image. For example, the posture change of the electronic device may be an "S" track of the electronic device in the air, and the augmented reality model is adjusted to make the augmented reality model display an "S" shaped effect.

Figure 2:
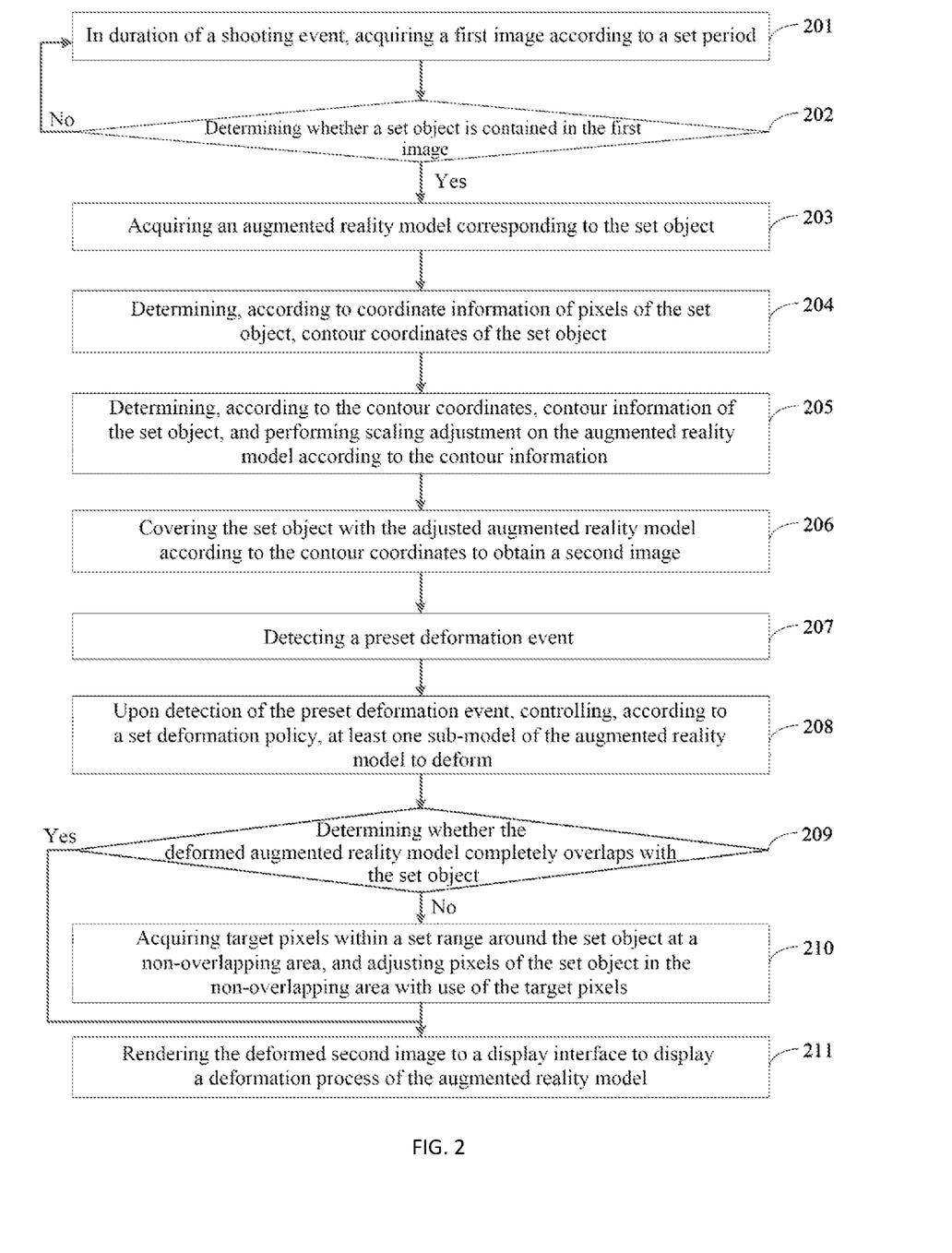
FIG. 2 is another flowchart of an image effect implementing method according to an embodiment of the present disclosure.

FIG. 2 is another flowchart of an image effect implementing method according to an embodiment of the present disclosure. The method includes the following steps.

Step 201, in duration of a shooting event, acquiring a first image according to a set period.

Step 202, recognizing the first image, and determining, according to a recognition result, whether a set object is included in the first image, upon determining that the set object is contained in the first image, proceed with Step 203, otherwise, display the first image, and proceed with Step 201.

Step 203, acquiring an augmented reality model corresponding to the set object.

Step 204, determining, according to coordinate information of pixels of the set object, contour coordinates of the set object.

Step 205, determining, according to the contour coordinates, contour information of the set object, and performing scaling adjustment on the augmented reality model according to the contour information.

Step 206, covering the set object with the adjusted augmented reality model according to the contour coordinates to obtain a second image.

In the embodiment of the present disclosure, the covering means that the augmented reality model subjected to the scaling adjustment coincides with the set object, or, the size of the augmented reality model subjected to the scaling adjustment is a multiple of the size of the set object, such that the augmented reality model completely overlaps with the set object after the augmented reality model is superimposed to a position of the set object in the first image.

Step 207, detecting a preset deformation event.

Step 208, upon detection of the preset deformation event, controlling, according to a set deformation policy, at least one sub-model of the augmented reality model to deform.

Step 209, determining whether the deformed augmented reality model completely overlaps with the set object, upon determining that the deformed augmented reality model does not overlap completely with the set object, proceed with Step 210, otherwise, proceed with Step 211.

In the embodiment of the present disclosure, regarding any frame of second image, compare pixels of the set object with pixels of the augmented reality model, and determine, according to a comparison result, whether the deformed augmented reality model completely overlaps with the set object. If the pixels of the set object are all in an area formed by the pixels corresponding to the augmented reality model, it is considered that the set object completely overlaps with the augmented reality model, otherwise, it is considered that the set object incompletely overlaps with the augmented reality model;

Step 210, acquiring target pixels within a set range around the set object at a non-overlapping area, and adjusting pixels of the set object in the non-overlapping area with use of the target pixels.

It should be noted that, with a contour of the set object taken as a basis, the set range is set in advance as an area obtained by enlarging the set object by a set multiple. The set multiple may be an empirical value which can be adjusted according to different application scenarios.

For example, acquire, from the pixels of the set object, non-overlapping pixels that do not fall into an area formed by the pixels corresponding to the augmented reality model; acquire target pixels around the non-overlapping pixels within the set range, and replace pixels of the set object in a non-overlapping area with use of the target pixels. For example, delete the above non-overlapping pixels from an image layer where the set object is located, to form a to-be-filled area in the image layer, and fill the to-be-filled area with the target pixels correspondingly.

Step 211, rendering the deformed second image to a display interface to display a deformation process of the augmented reality model.

For example, render multiple frames of the adjusted second images sequentially to the display interface, thereby a segment of video showing a deformation process of the augmented reality model can be displayed. If the augmented reality model is rendered with the texture of the set object, a deformation process of the set object is presented for users.

In the embodiment of the present disclosure, after the second image is obtained by means of adding the augmented reality model to the first image, the pixels of the augmented reality model in each frame of second image may be adjusted to deform the augmented reality model; when the deformed augmented reality model incompletely overlaps with the set object, acquire target pixels within a set range around the set object at a non-overlapping area, and adjust pixels of the set object in a non-overlapping area with use of the target pixels; subsequently, render multiple frames of second images sequentially to the display interface to display a deformation process of the augmented reality model. Thus, a deformation process of the set object can be displayed, thereby enriching an image display effect, solving a problem that the display effect is relatively simple, and providing a new way of playing to improve user experience.

Figure 3:
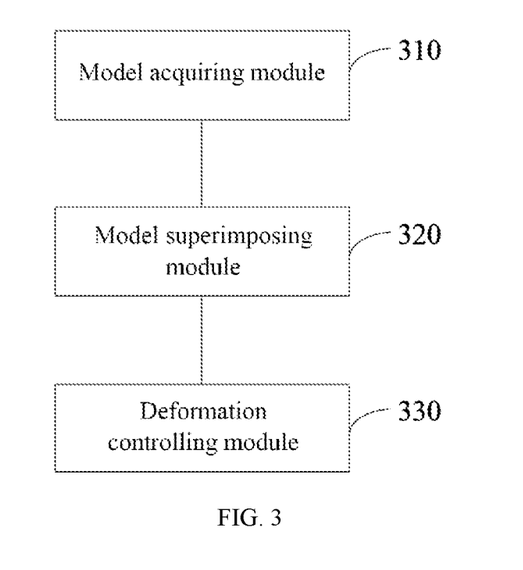
FIG. 3 is a structural diagram of an image effect implementing apparatus according to an embodiment of the present disclosure.

FIG. 3 is a structural diagram of an image effect implementing apparatus according to an embodiment of the present disclosure. The apparatus can be implemented by software and/or hardware, and typically integrated in an electronic device to enrich a display effect of a captured image through execution of the image effect implementing method according to the embodiments of the present disclosure. As shown in FIG. 3, the apparatus includes:

a model acquiring module 310, configured to acquire a first image, recognize a set object in the first image, and acquire an augmented reality model corresponding to the set object;

a model superimposing module 320, configured to superimpose, according to coordinate information of pixels of the set object, the augmented reality model onto the first image to obtain a second image; and a deformation controlling module 330, configured to control, upon detection of a preset deformation event, at least one sub-model of the augmented reality model in the second image to deform, according to a set deformation strategy, and display the deformed second image.

The image effect implementing apparatus provided in the embodiment of the present disclosure is configured to implement the image effect implementing method. The implementation principles and technical effects of the image effect implementing apparatus are similar to that of the image effect implementing method, which will not be repeated here.

An embodiment of the present disclosure further provides a computer-readable storage medium having a computer program stored thereon, where the image effect implementing method according to the foregoing method embodiments is implemented when the program is executed by a processor.

An embodiment of the present disclosure further provides a computer program product having a computer program stored thereon, where the image effect implementing method according to the foregoing method embodiments is implemented when the program is executed by a processor.

An embodiment of the present disclosure further provides a computer program, where the computer program, when running on a computer, enables the computer to implement the image effect implementing method according to the foregoing method embodiments.

Figure 4:
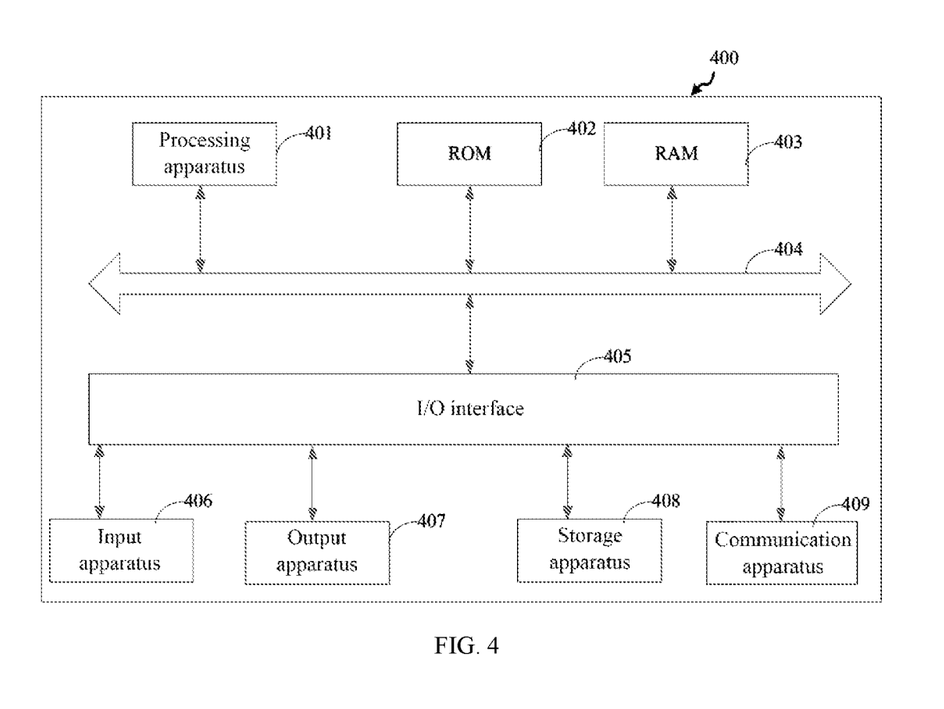
FIG. 4 is a structural diagram of an electronic device according to an embodiment of the present disclosure.

FIG. 4 is a structural diagram of an electronic device according to an embodiment of the present disclosure. In the following, reference is made to FIG. 4, which shows a schematic structural diagram of an electronic device 400 suitable for implementing an embodiment of the present disclosure. The electronic device in the embodiment of the present disclosure may include, but is not limited to, mobile terminals such as a mobile phone, a notebook computer, a digital broadcast receiver, a PDA (personal digital assistant), a PAD (portable android device), a PMP (portable multimedia player), a vehicle-mounted terminal (such as a vehicle-mounted navigation terminal), etc., and stationary terminals such as a digital TV, a desktop computer, etc. The electronic device shown in FIG. 4 is only an example, which should not impose any limitation on the function and applying scope of the embodiments of the present disclosure.

As shown in FIG. 4, the electronic device 400 may include a processing apparatus (e.g., a central processing unit, a graphics processor, etc.) 401 which may perform various appropriate actions and processes according to a program stored in a read only memory (ROM) 402 or a program loaded from a storage apparatus 408 into a random access memory (RAM) 403. Various programs and data necessary for the operation of the electronic device 400 are further stored in the RAM 403. The processing apparatus 401, ROM 402, and RAM 403 are connected to each other through a bus 404. And an input/output (Input/Output, I/O) interface 405 is also connected to the bus 404.

Generally, the following apparatuses may be connected to the I/O interface 405: an input apparatus 406 including, for example, a touch screen, a touchpad, a keyboard, a mouse, a camera, a microphone, an accelerometer, a gyroscope, etc.; an output apparatus 407 including, for example, a liquid crystal display (LCD), a speaker, a vibrator, etc.; a storage apparatus 408 including, for example, a magnetic tape, a hard disk or the like; and a communication apparatus 409. The communication apparatus 409 may allow the electronic device 400 to perform wireless or wired communication with other devices to exchange data. Although FIG. 4 shows the electronic device 400 having various apparatuses, it should be understood that not all of the illustrated apparatuses are required to be implemented or provided. More or fewer apparatuses may alternatively be implemented or provided.

Specially, according to an embodiment of the present disclosure, the processes described above with reference to the flowcharts may be implemented as a computer software program. For example, an embodiment of the present disclosure includes a computer program product including a computer program carried on a non-transitory computer-readable medium, where the computer program includes program codes for performing the method illustrated in the flowchart. In such embodiment, the computer program may be downloaded and installed from a network via the communication apparatus 409, or installed from the storage apparatus 408, or installed from the ROM 402. When the computer program is executed by the processing apparatus 401, the above-mentioned functions limited in the method according to the embodiments of the present disclosure are executed.

It should be noted that the computer-readable medium described in the present disclosure may be a computer-readable signal medium or a computer-readable storage medium or any combination thereof. The computer-readable storage medium may be, for example, but not limited to, an electrical, a magnetic, an optical, an electromagnetic, an infrared, or a semiconductor system, apparatus or device, or any combination thereof. More specific examples of the computer-readable storage medium may include, but not limited to, an electrically connected portable computer disk with one or more wires, a hard disk, a RAM, a ROM, an erasable programmable read only memory (EPROM) or flash memory, an optical fiber, a portable compact disk read only memory (CD-ROM), an optical storage device, a magnetic storage device, or any suitable combination thereof. In the present disclosure, the computer-readable storage medium may be any tangible medium that includes or stores a program that may be used by or used in combination with an instruction execution system, apparatus, or device. And in the present disclosure, the computer-readable signal medium may include a data signal propagated in baseband or as part of a carrier wave, carrying computer-readable program codes therein. Such propagated data signal may take a variety of forms, including but not limited to an electromagnetic signal, an optical signal, or any suitable combination thereof. The computer-readable signal medium may also be any computer-readable medium other than the computer-readable storage medium, and the computer-readable signal medium can transmit, propagate, or transport the program used by or used in combination with the instruction execution system, apparatus or device. The program codes included on the computer-readable medium may be transmitted through any suitable medium including, but not limited to, an electrical wire, an optical fiber cable, an RF (Radio Frequency), etc., or any suitable combination thereof.

In some embodiments, a client and a server may use any currently known or future developed network protocol such as HTTP (HyperText Transfer Protocol) to communicate, and may be interconnected with any form or medium of digital data communication (e.g., a communication network). Examples of the communication network include a local area network (LAN), a wide area network (WAN), an internet (e.g., the Internet), and a peer-to-peer network (e.g., an ad hoc peer-to-peer network), as well as any currently known or future developed network.

The above-mentioned computer-readable medium may be included in the above-mentioned electronic device; or may exist alone without being assembled into the electronic device.

The above-mentioned computer-readable medium carries one or more programs, and when the above-mentioned one or more programs are executed by the electronic device, the electronic device is enabled to: acquire a first image, recognize a set object in the first image, and acquire an augmented reality model corresponding to the set object;
  superimpose, according to coordinate information of pixels of the set object, the augmented reality model onto the first image to obtain a second image; and
  upon detection of a preset deformation event, control, according to a set deformation policy, at least one sub-model of the augmented reality model in the second image to deform, and display the deformed second image.

The computer program codes for performing an operation of the present disclosure may be written in one or more programming languages or a combination thereof, where the above programming languages include but are not limited to an object-oriented programming language, such as Java, Smalltalk, and C++, as well as a conventional procedural programming language, such as "C" or similar programming languages. The program codes may be executed entirely on a user computer, executed partly on a user computer, executed as a stand-alone software package, executed partly on a user computer and partly on a remote computer, or executed entirely on a remote computer or a server. In a case involving the remote computer, the remote computer may be connected to the user computer through any kind of network, including aLAN or a WAN, or may be connected to an external computer (e.g., connected via the Internet using an Internet service provider).

The flowchart and block diagrams in the figures illustrate the architecture, functionality, and operation of possible implementations of the system, method and computer program product according to various embodiments of the present disclosure. In this regard, each block in the flowcharts or block diagrams may represent a module, a program segment, or a portion of codes that includes one or more executable instructions for implementing a specified logical function. Furthermore, it should be noted that, in some alternative implementations, functions indicated in the blocks may occur in an order different from that indicated in the figures. For example, two blocks shown in succession may, in fact, be executed substantially concurrently, or the blocks may sometimes be executed in the reverse order, depending upon the functionality involved. It also should be noted that each block of the block diagrams and/or flowcharts, or a combination of blocks in the block diagrams and/or flowcharts may be implemented in a special purpose hardware-based system that perform a specified function or operation, or may be implemented in a combination of special purpose hardware and a computer instruction.

The involved modules described in embodiments of the present disclosure may be implemented by means of software, and may also be implemented by means of hardware. Names of these modules do not constitute a limitation on the modules per se under certain circumstances.

The foregoing functions described herein may be performed, at least in part, by one or more hardware logic components. For example, without limitation, exemplary types of hardware logic components that may be used include: a field programmable gate array (FPGA), an application-specific integrated circuit (ASIC), an application specific standard product (ASSP), a system on chip (SOC), a complex programmable logical device (CPLD) and more.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. The machine-readable medium may include, but not limited to, an electronic, a magnetic, an optical, an electromagnetic, an infrared, or a semiconductor system, apparatus, or device, or any suitable combination of the foregoing. More specific examples of the machine-readable storage medium would include electrically connected portable computer disks based on one or more wires, hard disks, RAM, ROM, EPROM, fiber optics, CD-ROM, optical storage devices, magnetic storage devices, or any suitable combination of the foregoing.

According to one or more embodiments of the present disclosure, the present disclosure provides an image effect implementing method, where the acquiring the first image, the recognizing the set object in the first image, and the acquiring the augmented reality model corresponding to the set object include:
  in duration of a shooting event, acquiring the first image according to a set period;
  recognizing the first image, and determining, according to a recognition result, whether the set object is contained in the first image;
  upon determining that the set object is contained in the first image, acquiring the augmented reality model corresponding to the set object.

According to one or more embodiments of the present disclosure, the present disclosure provides an image effect implementing method, where the superimposing, according to the coordinate information of the pixels of the set object, the augmented reality model onto the first image to obtain the second image includes:
  determining, according to the coordinate information of the pixels of the set object, contour coordinates of the set object;
  determining, according to the contour coordinates, contour information of the set object, and performing scaling adjustment on the augmented reality model according to the contour information; and
  covering the set object with the adjusted augmented reality model according to the contour coordinates to obtain the second image.

According to one or more embodiments of the present disclosure, the present disclosure provides an image effect implementing method, where the superimposing, according to the coordinate information of the pixels of the set object, the augmented reality model onto the first image to obtain the second image includes:
  determining, according to the coordinate information of the pixels of the set object, contour coordinates of the set object;
  determining, according to the contour coordinates, contour information of the set object, and performing scaling adjustment on the augmented reality model according to the contour information;
  replacing the set object with the adjusted augmented reality model according to the contour coordinates to obtain the second image.

According to one or more embodiments of the present disclosure, the present disclosure provides an image effect implementing method, after the superimposing, according to the coordinate information of the pixels of the set object, the augmented reality model onto the first image to obtain the second image, the method further includes: triggering the preset deformation event upon detection of at least one item of the following content:
  a human posture change in the second image satisfying a first preset condition;
  music beats;
  a touch operation satisfying a second preset condition;
  an posture change of an electronic device satisfying a third preset condition.

According to one or more embodiments of the present disclosure, the present disclosure provides an image effect implementing method where, upon detection of the preset deformation event, the controlling, according to the set deformation policy, the at least one sub-model of the augmented reality model in the second image to deform includes:
  upon detection of the preset deformation event triggered based on the human posture change in the second image, adjusting, according to human posture information, a corresponding pixel of the at least one sub-model of the augmented reality model, to obtain the deformed second image.

According to one or more embodiments of the present disclosure, the present disclosure provides an image effect implementing method where, upon detection of the preset deformation event, the controlling, according to the set deformation policy, the at least one sub-model of the augmented reality model in the second image to deform includes:
  upon detection of the preset deformation event triggered based on the music beats, adjusting, according to the music beats, a corresponding pixel of the at least one sub-model of the augmented reality model, to obtain the deformed second image.

According to one or more embodiments of the present disclosure, the present disclosure provides an image effect implementing method where, upon detection of the preset deformation event, the controlling, according to the set deformation policy, the at least one sub-model of the augmented reality model in the second image to deform includes:
  upon detection of the preset deformation event triggered by the touch operation, adjusting, according to attribute information of the touch operation, a corresponding pixel of the at least one sub-model of the augmented reality model, to obtain the deformed second image.

According to one or more embodiments of the present disclosure, the present disclosure provides an image effect implementing method where, upon detection of the preset deformation event, the controlling, according to the set deformation policy, the at least one sub-model of the augmented reality model in the second image to deform includes:

upon detection of the preset deformation event triggered based on the posture change of the electronic device, adjusting, according to posture information of the electronic device, a corresponding pixel of the at least one sub-model of the augmented reality model, to obtain the deformed second image.

According to one or more embodiments of the present disclosure, the present disclosure provides an image effect implementing method. After the controlling, according to the set deformation policy, the at least one sub-model of the augmented reality model in the second image to deform, the method further includes:

when the deformed augmented reality model incompletely overlaps with the set object, acquiring target pixels within a set range around the set object at a non-overlapping area, and adjusting pixels of the set object in the non-overlapping area with use of the target pixels.

According to one or more embodiments of the present disclosure, the present disclosure provides an image effect implementing method, where the displaying the deformed second image includes:

rendering the deformed second image to a display interface to display a deformation process of the augmented reality model.

According to one or more embodiments of the present disclosure, the present disclosure provides an image effect implementing apparatus, where the model acquiring module is specifically configured to:

in duration of a shooting event, acquire the first image according to a set period;

recognize the first image, and determine, according to a recognition result, whether the set object is contained in the first image;

upon determining that the set object is contained in the first image, acquire the augmented reality model corresponding to the set object.

According to one or more embodiments of the present disclosure, the present disclosure provides an image effect implementing apparatus, where the model superimposing module is specifically configured to:

determine, according to the coordinate information of the pixels of the set object, contour coordinates of the set object;

determine, according to the contour coordinates, contour information of the set object, and perform scaling adjustment on the augmented reality model according to the contour information; and cover the set object with the adjusted augmented reality model according to the contour coordinates to obtain the second image.

According to one or more embodiments of the present disclosure, the present disclosure provides an image effect implementing apparatus, where the model superimposing module is specifically configured to:

determine, according to the coordinate information of the pixels of the set object, contour coordinates of the set object;

determine, according to the contour coordinates, contour information of the set object, and perform scaling adjustment on the augmented reality model according to the contour information;

replace the set object with the adjusted augmented reality model according to the contour coordinates to obtain the second image.

According to one or more embodiments of the present disclosure, the present disclosure provides an image effect implementing apparatus which further including an event triggering module. The event triggering module is configured to: after the superimposing, according to the coordinate information of the pixels of the set object, the augmented reality model onto the first image to obtain the second image, trigger the preset deformation event upon detection of at least one item of the following content:

a human posture change in the second image satisfying a first preset condition;

music beats;

a touch operation satisfying a second preset condition;

an posture change of an electronic device satisfying a third preset condition.

According to one or more embodiments of the present disclosure, the present disclosure provides an image effect implementing apparatus, where the deformation controlling module is specifically configured to:

upon detection of the preset deformation event triggered based on the human posture change in the second image, adjust, according to human posture information, a corresponding pixel of the at least one sub-model of the augmented reality model, to obtain the deformed second image.

According to one or more embodiments of the present disclosure, the present disclosure provides an image effect implementing apparatus, where the deformation controlling module is specifically configured to:

upon detection of the preset deformation event triggered based on the music beats, adjust, according to the music beats, a corresponding pixel of the at least one sub-model of the augmented reality model, to obtain the deformed second image.

According to one or more embodiments of the present disclosure, the present disclosure provides an image effect implementing apparatus, where the deformation controlling module is specifically configured to:

upon detection of the preset deformation event triggered by the touch operation, adjust, according to attribute information of the touch operation, a corresponding pixel of the at least one sub-model of the augmented reality model, to obtain the deformed second image.

According to one or more embodiments of the present disclosure, the present disclosure provides an image effect implementing apparatus, where the deformation controlling module is specifically configured to:

upon detection of the preset deformation event triggered based on the posture change of the electronic device, adjust, according to posture information of the electronic device, a corresponding pixel of the at least one sub-model of the augmented reality model, to obtain the deformed second image.

According to one or more embodiments of the present disclosure, the present disclosure provides an image effect implementing apparatus which further includes an image adjusting module. The image adjusting module is specifically configured to:

after the controlling, according to the set deformation policy, the at least one sub-model of the augmented reality model in the second image to deform, when the deformed augmented reality model incompletely overlaps with the set object, acquire target pixels within a set range around the set object at a non-overlapping area, and adjust pixels of the set object in the non-overlapping area with use of the target pixels.

According to one or more embodiments of the present disclosure, the present disclosure provides an image effect implementing apparatus, where the deformation controlling module is further specifically configured to:

render the deformed second image to a display interface to display a deformation process of the augmented reality model.

The above descriptions are merely a preferred embodiment of the present disclosure and illustrations of an applied technical principle. The person skilled in the art should understand that the disclosure scope involved in the present disclosure is not limited to a technical solution formed by a specific combination of the above-mentioned technical features, and should also cover other technical solutions formed by any combination of the above technical features or their equivalents without departing from the above disclosure concept, for example, a technical solution formed by a mutual replacement between the above features and the technical features with similar functions (but not limited to) disclosed in the present disclosure.

In addition, although operations are depicted in a particular order, it should not be construed as requiring these operations to be performed in the specific order shown or in sequential order. Under a certain circumstance, multitasking and parallel processing may be advantageous. Likewise, although the above discussion contains several implementation-specific details, these should not be interpreted as limiting the scope of the present disclosure. Certain features described in the context of individual embodiments may also be implemented in combination in a single embodiment. Conversely, various features described in the context of a single embodiment may also be implemented in multiple embodiments individually or in any suitable sub-combination.

Although the subject matter has been described in language specific to a structural feature and/or a methodological action, it should be understood that the subject matter defined in the appended claims is not necessarily limited to the specific features or actions described above. On the contrary, the specific feature and action described above are merely an example form of implementing the claims.

What is claimed is:

1. An image effect implementing method, comprising:
acquiring a first image, recognizing a set object in the first image, and acquiring an augmented reality model corresponding to the set object, wherein the first image is an image of a real world captured by a camera of an electronic device and the augmented reality model is a three dimensional model established for the set object in the real world in advance;
superimposing, according to coordinate information of pixels of the set object, the augmented reality model onto the first image to obtain a second image; and
upon detection of a preset deformation event, controlling, according to a set deformation policy, at least one sub-model of the augmented reality model corresponding to the set object in the second image to deform, and displaying the deformed second image,
wherein different preset conditions trigger different preset deformation events, and the preset deformation event is indicative of deforming the at least one sub-model of the augmented reality model according to the set deformation policy corresponding to the preset deformation event, and
wherein the superimposing, according to the coordinate information of the pixels of the set object, the augmented reality model onto the first image to obtain the second image comprises:
determining, according to the coordinate information of the pixels of the set object, contour coordinates of the set object;
determining, according to the contour coordinates, contour information of the set object, and performing scaling adjustment on the augmented reality model corresponding to the set object according to the contour information; and
covering or replacing the set object with the adjusted augmented reality model corresponding to the set object according to the contour coordinates to obtain the second image.

2. The method according to claim 1, wherein the acquiring the first image, the recognizing the set object in the first image, and the acquiring the augmented reality model corresponding to the set object comprise:
in duration of a shooting event, acquiring the first image according to a set period;
recognizing the first image, and determining, according to a recognition result, whether the set object is contained in the first image; and
upon determining that the set object is contained in the first image, acquiring the augmented reality model corresponding to the set object.

3. The method according to claim 2, wherein the first image is acquired according to a set period corresponding to a shooting scenario in the duration of the shooting event.

4. The method according to claim 1, after the superimposing, according to the coordinate information of the pixels of the set object, the augmented reality model onto the first image to obtain the second image, further comprising:
triggering the preset deformation event upon detection of at least one item of the following content:
a human posture change in the second image satisfying a first preset condition;
music beats;
a touch operation satisfying a second preset condition; and
a posture change of the electronic device satisfying a third preset condition.

5. The method according to claim 4, wherein, upon detection of the preset deformation event, the controlling, according to the set deformation policy, the at least one sub-model of the augmented reality model in the second image to deform comprises:
upon detection of the preset deformation event triggered based on the human posture change in the second image, adjusting, according to human posture information, a corresponding pixel of the at least one sub-model of the augmented reality model, to obtain the deformed second image.

6. The method according to claim 4, wherein, upon detection of the preset deformation event, the controlling, according to the set deformation policy, the at least one sub-model of the augmented reality model in the second image to deform comprises:
upon detection of the preset deformation event triggered based on the music beats, adjusting, according to the music beats, a corresponding pixel of the at least one sub-model of the augmented reality model, to obtain the deformed second image.

7. The method according to claim 4, wherein, upon detection of the preset deformation event, the controlling, according to the set deformation policy, the at least one sub-model of the augmented reality model in the second image to deform comprises:
- upon detection of the preset deformation event triggered by the touch operation, adjusting, according to attribute information of the touch operation, a corresponding pixel of the at least one sub-model of the augmented reality model, to obtain the deformed second image.

8. The method according to claim 7, wherein the attribute information of the touch operation comprises a touch position, a touch time, a number of times of touch, and a touch type.

9. The method according to claim 4, wherein, upon detection of the preset deformation event, the controlling, according to the set deformation policy, the at least one sub-model of the augmented reality model in the second image to deform comprises:
- upon detection of the preset deformation event triggered based on the posture change of the electronic device, adjusting, according to posture information of the electronic device, a corresponding pixel of the at least one sub-model of the augmented reality model, to obtain the deformed.

10. The method according to claim 1, after the controlling, according to the set deformation policy, the at least one sub-model of the augmented reality model in the second image to deform, further comprising:
- when the deformed augmented reality model incompletely overlaps with the set object, acquiring target pixels within a set range around the set object at a non-overlapping area, and adjusting pixels of the set object in the non-overlapping area with use of the target pixels.

11. The method according to claim 1, wherein the displaying the deformed second image comprises:
- rendering the deformed second image to a display interface to display a deformation process of the augmented reality model.

12. A non-transitory computer-readable storage medium having a computer program stored thereon, wherein the image effect implementing method according to claim 1 is implemented when the program is executed by a processor.

13. The method according to claim 1, wherein the controlling, according to the set deformation policy, the at least one sub-model of the augmented reality model corresponding to the set object in the second image to deform, comprises:
- determining condition type information that triggers the preset deformation event according to identification information of the preset deformation event; and
- matching a corresponding deformation policy according to the condition type information, and adjusting a position and a depth of field of a pixel of the at least one sub-model of the augmented reality model with use of the deformation policy.

14. An electronic device, comprising:
one or more processors, and
a memory for storing one or more programs,
wherein the one or more programs, when being executed by the one or more processors, enable the one or more processors to implement the steps of:
- acquiring a first image, recognizing a set object in the first image, and acquiring an augmented reality model corresponding to the set object, wherein the first image is an image of a real world captured by a camera of the electronic device and the augmented reality model is a three dimensional model established for the set object in the real world in advance;
- superimposing, according to coordinate information of pixels of the set object, the augmented reality model onto the first image to obtain a second image; and
- upon detection of a preset deformation event, controlling, according to a set deformation policy, at least one sub-model of the augmented reality model corresponding to the set object in the second image to deform, and displaying the deformed second image,
wherein different preset conditions trigger different preset deformation events, and the preset deformation event is indicative of deforming the at least one sub-model of the augmented reality model according to the set deformation policy corresponding to the preset deformation event, and
wherein the one or more programs further enable the one or more processors to implement the steps of:
- determining, according to the coordinate information of the pixels of the set object, contour coordinates of the set object;
- determining, according to the contour coordinates, contour information of the set object, and performing scaling adjustment on the augmented reality model corresponding to the set object according to the contour information; and
- covering or replacing the set object with the adjusted augmented reality model corresponding to the set object according to the contour coordinates to obtain the second image.

15. The device according to claim 14, wherein the one or more programs enable the one or more processors to implement the steps of:
- in duration of a shooting event, acquiring the first image according to a set period;
- recognizing the first image, and determining, according to a recognition result, whether the set object is contained in the first image; and
- when the set object is contained in the first image, acquiring the augmented reality model corresponding to the set object.

16. The device according to claim 14, wherein the one or more programs further enable the one or more processors to implement the steps of: triggering the preset deformation event upon detection of at least one item of the following content:
- a human posture change in the second image satisfying a first preset condition;
- music beats;
- a touch operation satisfying a second preset condition; and
- a posture change of the electronic device satisfying a third preset condition.

* * * * *